United States Patent [19]
Zurke et al.

[11] Patent Number: 5,676,345
[45] Date of Patent: Oct. 14, 1997

[54] ELECTROMAGNETIC VALVE

[75] Inventors: Janusz Zurke, Wuppertal; Werner Buse, Kaarst; Horst Scheiff, Willich, all of Germany

[73] Assignee: Pierburg GmbH, Neuss, Germany

[21] Appl. No.: 521,592

[22] Filed: Aug. 30, 1995

[30] Foreign Application Priority Data

Aug. 30, 1994 [DE] Germany ............. 44 30 723.3

[51] Int. Cl.$^6$ ............. F16K 31/06; F16K 25/00
[52] U.S. Cl. ............. 251/129.15; 251/86
[58] Field of Search ............. 251/129.15, 86, 251/88, 129.01; 137/544, 550, 511, 854

[56] References Cited

U.S. PATENT DOCUMENTS

| | | |
|---|---|---|
| 2,596,409 | 5/1952 | Johnson et al. |
| 2,703,582 | 3/1955 | Stepanian ............. 137/513.7 |
| 3,554,487 | 1/1971 | Vesco ............. 251/86 X |
| 3,810,489 | 5/1974 | MacManus et al. |
| 4,647,011 | 3/1987 | Contzen et al. ............. 251/129.15 |
| 5,145,148 | 9/1992 | Laurent. |

FOREIGN PATENT DOCUMENTS

| | | |
|---|---|---|
| 4033946 | 4/1992 | Germany. |
| 4140255 | 6/1993 | Germany. |
| 4305987 | 11/1993 | Germany. |

Primary Examiner—Kevin Lee
Attorney, Agent, or Firm—Ladas & Parry

[57] ABSTRACT

An electromagnetic switching valve for use in an internal combustion engine has a coil housing containing an electrical coil, and a value housing containing a valve plate for selectively opening and closing an opening in the housing through which a medium can flow from an inlet to an outlet thereof. An armature is in operative association with the coil electrical coil for undergoing longitudinal movement in the housing depending upon energization of the coil, and the armature acts on a rod movable with the armature. The rod is radially guided during movement thereof, and the rod is connected by a ball and socket joint to the valve plate. The rod is engaged with the armature within the coil housing for longitudinal movement therewith without any radial connection therebetween. The valve housing which containins the valve plate can be inserted in a surrounding connection housing which may contain a filter and elastic valve elements for pressure control.

20 Claims, 6 Drawing Sheets

5,676,345

ELECTROMAGNETIC VALVE

FIELD OF THE INVENTION

The invention relates to an electromagnetic valve and particularly to an on-off or switching valve for use with an internal combustion engine.

BACKGROUND AND PRIOR ART

In internal combustion engines, on-off valves are utilized for various switching functions. For example, DE A1 41 40 255 discloses an on-off electromagnetic valve for a ventilation device for a fuel tank, which controls connection of an air line to the outside atmosphere. The air line, which can be closed by the valve, makes it possible to adjust, as desired, underpressures and overpressures in the unit, in order to control its functional operation. The valve is a mass-produced product, which must be manufactured economically. This will be achieved if the manufacturing facility can produce a large number of finished products.

SUMMARY OF THE INVENTION

An object of the invention, is to provide an electromagnetic switching valve which can be manufactured economically and has a basic configuration from which several variations can be obtained and which is of small size and has a minimum number of parts. One of said variations includes means for limiting underpressures or overpressures that could otherwise disturb the unit.

The above and further objects of the invention are satisfied by a construction of the electromagnetic switching valve which comprises a coil housing containing an electrical coil and a valve plate is provided in a valve housing for selectively opening and closing an opening in said valve housing through which a medium can flow from an inlet to an outlet in the valve housing. All armature is provided in the coil housing in operative association with the electrical coil for undergoing longitudinal movement depending upon energization of the coil. A rod is movable with the armature and the rod is radially guided in the valve housing during longitudinal movement of the rod. The rod is connected by a ball and socket joint to the valve plate which allows the rod to be engaged with the armature for longitudinal movement therewith, without any radial connection. Namely, if the rod and armature become radially misaligned due to the absence of a radial connection therebetween, the ball and socket joint will take-up the misalignment.

The above construction represents a basic configuration of the electromagnetic switching valve and the basic configuration can be associated with a connection housing into which the valve housing is inserted. The connection housing can have several variations and in one variation it comprises top and bottom cup portions which are engaged with one another to be resiliently secured on the valve housing. A filter can be supported in the connection housing to filter the medium.

According to a feature of the invention, a bypass channel can be provided to bypass the opening in the first housing by directly connecting said inlet to said outlet through valve means in the bypass channel which selectively opens and closes the bypass channel. The valve means can operate automatically in response to predetermined underpressure and overpressure differences in the medium between said inlet and said outlet.

DETAILED DESCRIPTION OF PREFERRED EMBODIMENTS

Figure 1:
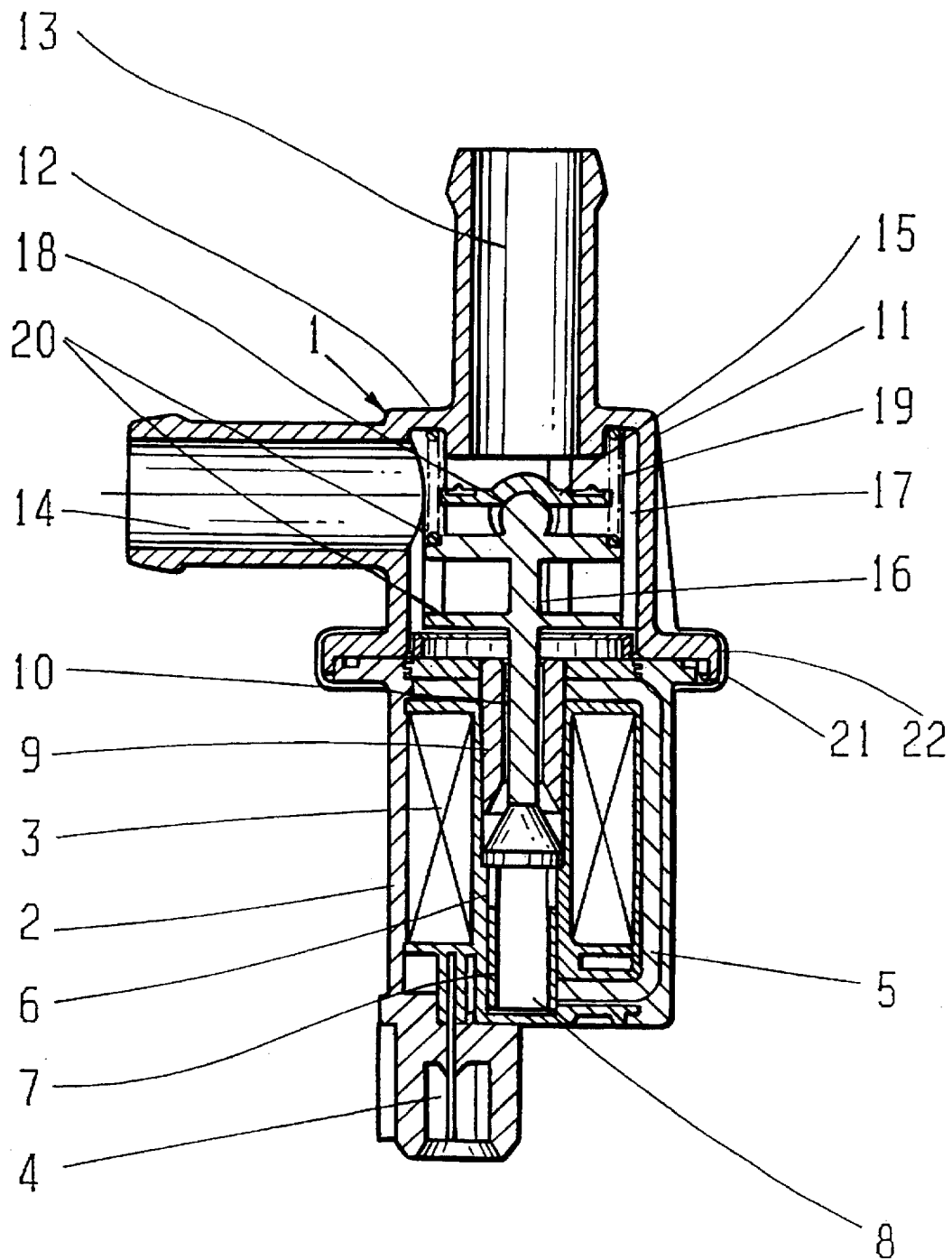
FIG. 1 is a longitudinal sectional view of an electromagnetic valve according to one embodiment of the invention.

FIG. 1 shows an electromagnetic valve 1 comprising a coil housing 2, in which an electrical coil 3 having electrical leads 4 and an armature yoke 5 are encapsulated. The leads 4 are connected to an energization circuit (not shown) which selectively energizes the coil. In a central bore 6 in housing 2 is a bearing 7 supporting magnetic armature 8, and an armature core 9. Armature core 9 has a through hole 10. The armature 8 is in operative association with coil 3 and core 9 so that the armature 8 undergoes longitudinal travel in bearing 7 depending upon energization of coil 3.

Valve 1 further comprises a valve housing 11 secured to coil housing 2 to collectively form therewith the electromagnetic valve 1. The valve housing 11 has an opening 12, with a surrounding valve seat, located between two connection stubs 13, 14 respective connected to an inlet and an outlet for a medium which flows through the valve 1 via opening 12. A valve plate 15 selectively opens and closes the opening 12 thereby opening and closing the electromagnetic valve 1.

An intermediate rod 16 is engaged between magnetic armature 8 and valve plate 15 and the rod 16 and the valve plate 15 are coupled together and are movable with the armature 8. The rod 16 is freely slidable in through hole 10 in armature core 9, and rod 16 is radially guided in valve housing 11 by longitudinal ribs 17 provided on the inner surface of valve housing 11. The valve plate 15 is supported radially and axially on rod 16 in a ball socket joint 18. If there is any misalignment between rod 16, which is guided axially, and valve plate 15 or armature 8, this will be taken-up by the ball and socket joint 18. The intermediate rod 16 rests on magnetic armature 8 without any radial connection. This simplifies the assembly since the armature 8 can be assembled in the coil housing 2 and the valve plate 15 and rod 16 can be assembled in the valve housing 11 and sealing of the opening 12 can be assured by the ball and socket joint 18.

Biasing spring 19 acts between valve housing 11 and intermediate rod 16 and urges the intermediate rod 16 against the magnetic armature 8 and also urges the valve plate 15 to the open position of the valve 1. The intermediate rod 16 has two integral disks 20 which extend radially and cooperate with the longitudinal ribs 17 in valve housing 11 to center and guide the intermediate rod 16.

Valve housing 11 and coil housing 2 have overlapping rims 21 which are held together by a bent metal ring clamp 22.

Figure 2:
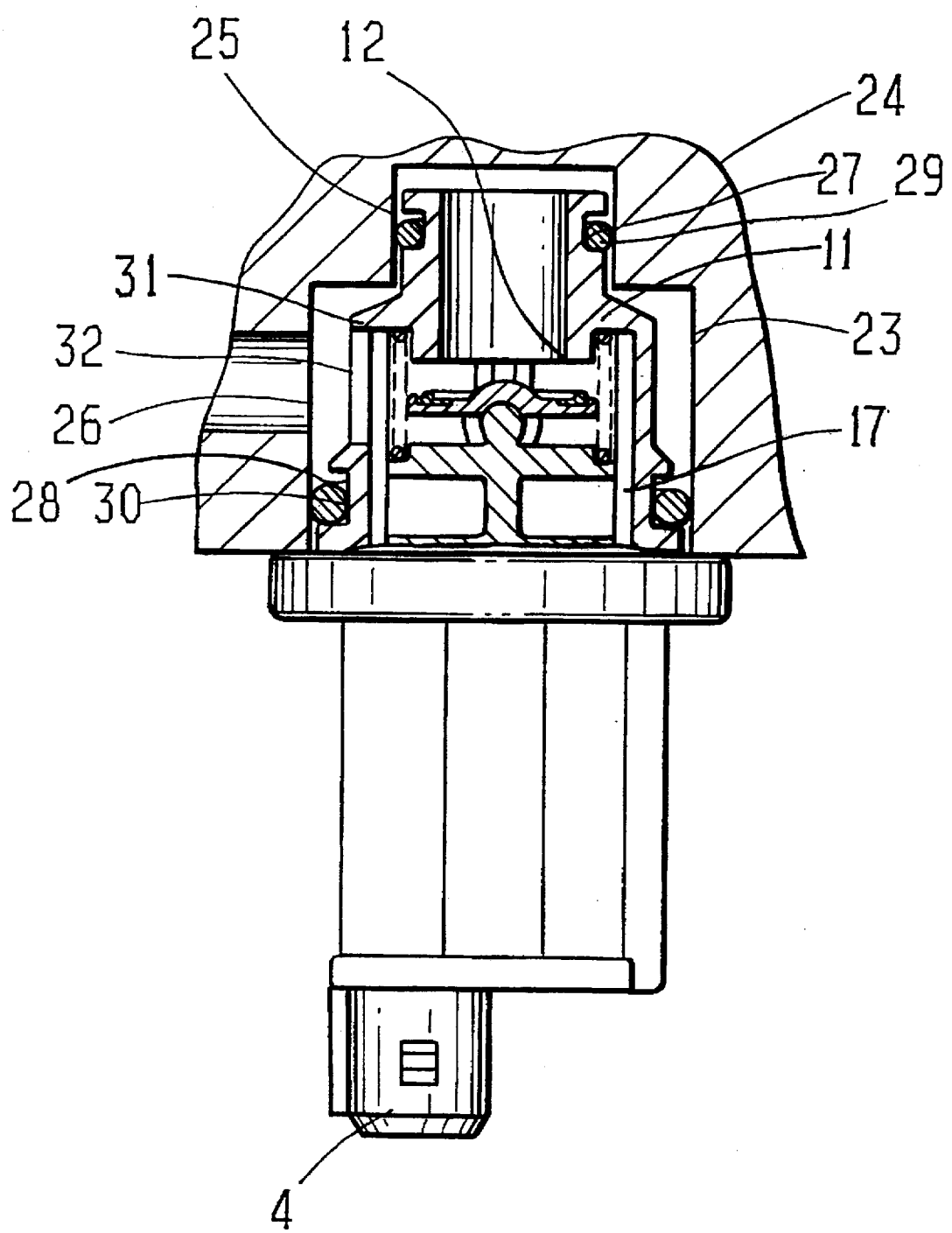
FIG. 2 is a modified embodiment of FIG. 1 shown partly in section.

FIG. 2 shows a variant of the embodiment according to FIG. 1, in which valve housing 11 is inserted into a stepped bore 23 of a connection housing 24. The stepped bore 23 defines smaller and larger diameter portions 25, 26 in valve housing 11. O-rings 29,30, inserted into respectives grooves 27, 28 in the valve housing 11 respectively engage the smaller and larger diameter portions 25, 26. The valve housing 11 has perforations 32 between the valve seat surrounding opening 12 and a shoulder 31 on valve housing 11 which projects into the larger diameter portion 26. The perforations 32 are circumferentially spaced between the longitudinal ribs 17. A longitudinal tang (not shown) may be present on shoulder 31 to project into a recess (not shown) in larger diameter portion 26 to prevent rotation of the valve 1. The position of electrical connections 4 thereby is fixed.

The other elements in FIG. 2 correspond to those illustrated in FIG. 1.

Figure 3:
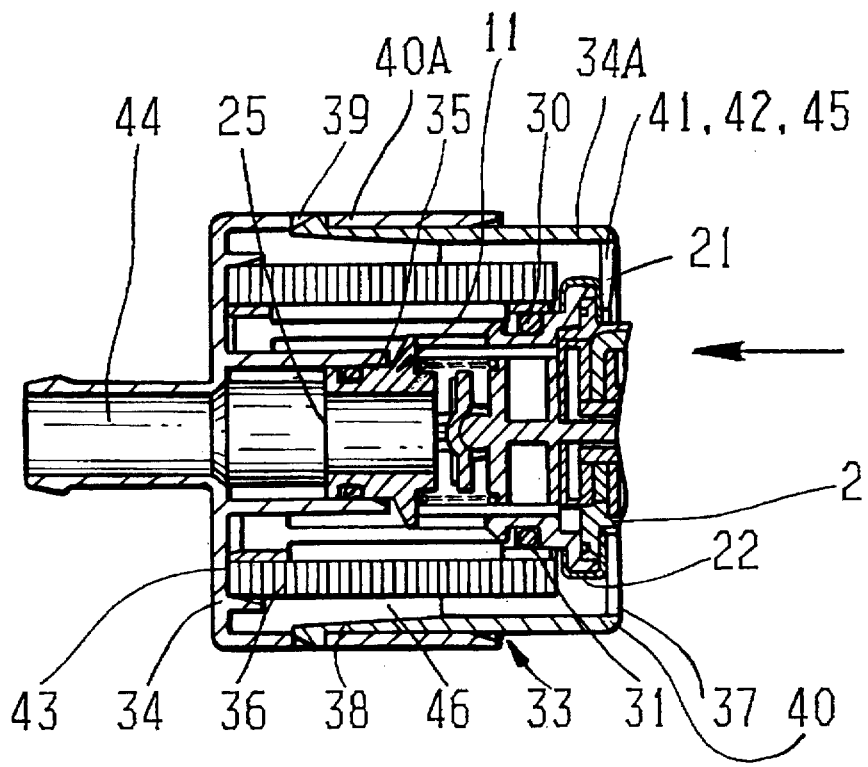
FIG. 3 shows another modification in longitudinal section in which only the upper portion of the electromagnetic valve is illustrated.
Figure 4:
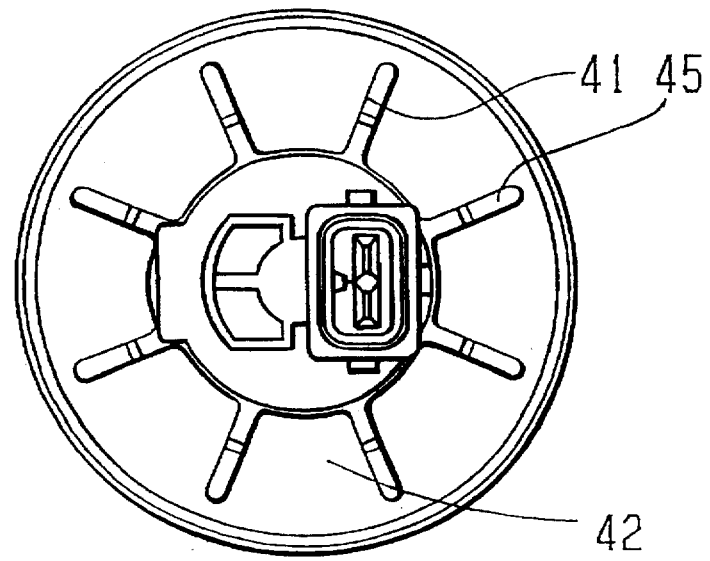
FIG. 4 is an end view seen in the direction of the arrow in FIG. 3.

FIGS. 3 and 4 show another variant, in which the basic valve construction of the embodiment according to FIG. 2 is utilized, and a connection housing is provided in the form of a filter housing 33. The filter housing 33 comprises top and bottom cup portions 34, 34A supporting a filter 36. The larger diameter top cup portion 34 is fitted on a smaller diameter portion 35 of the valve housing 11 and the filter 36 is carried by top cup portion 34 and extends beyond the larger diameter top cup portion 34. The bottom cup portion 34A has an end wall 37 which abuts axially against ring clamp 22 at the lower surface of rim 21 of the coil housing 2. The top and bottom cup portions 34, 34A have overlapping side walls 40, 40A and tongues 38 at the ends of arms on the bottom cup portion resiliently snap-fit into apertures 39 formed in the top cup portion 34.

Radial slots 41 are formed in end wall 37 and define resilient arms 42 therebetween.

The installation of the connection housing 33 in FIGS. 3 and 4 is as follows:

The top cup portion 34 is slidingly engaged on the small diameter portion 35 of the valve housing 11. The filter 36 extends beyond the larger diameter portion cup 34 and comes into abutment with the ring clamp 22 at the upper surface of the rim 21 of the valve housing 11. The bottom cup portion 34A is axially displaced over the coil housing 2 until the end wall 37 abuts against the ring clamp 22 at the lower surface of the rim 21 of the coil housing 2. An axial squeezing force is them applied to the top and bottom cup portions to snap fit the tongues 38 of the bottom portion 34A into the apertures 39 of the top portion 34. This puts the resilient arms 42 under stress to resiliently hold the connection housing 11 and 33 axially on the valve and coil housings.

Hence, as can be seen in FIG. 3, resilient arms 42 are engaged by spring action against ring clamp 22 when the top and bottom cup portions 34, 34A are snap-fitted together, and filter 36 is supported at one end on housing 2, and at the other end it abuts against end wall 43 of top cup portion 34. The top cup portion 34 has a connection 44, which opens into the interior of the smaller diameter portion 25 and the radial slots 41 form openings 45 leading to the ambient atmosphere. When the opening 12 is opened by valve plate 15, the medium flows into the connection 44 and through the perforations 32 in the valve housing to the filter 36 and then through the filter 36 into a chamber 46 formed in the filter housing 33 where the medium exits through the openings 45.

Figure 5:
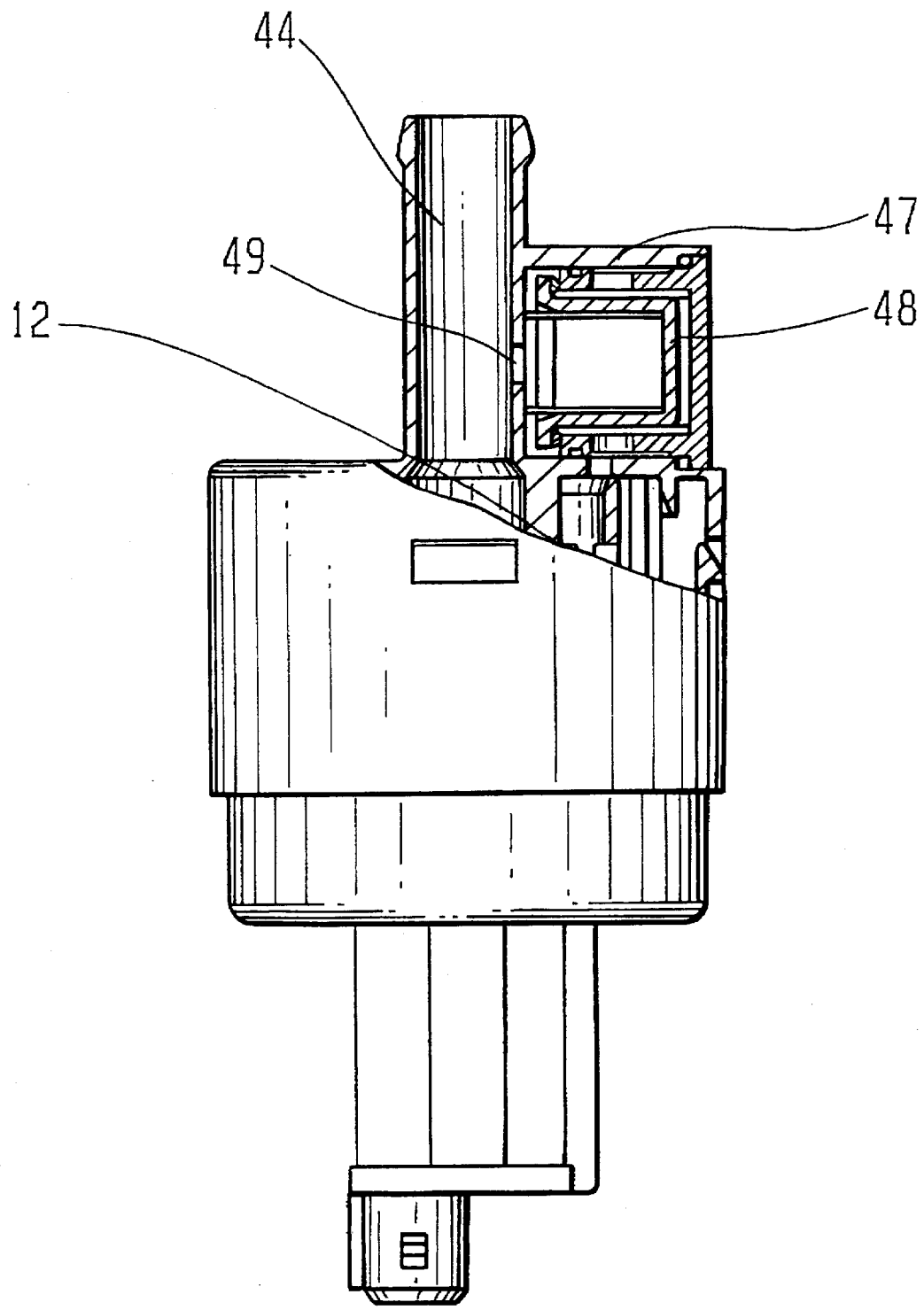
FIG. 5 shows another modification, partly broken away and in section, according to the invention.

In another embodiment of the invention as shown in FIG. 5, a branch 47 is arranged on connection 44. A suction valve 48 is provided in branch 47 to control flow of medium in a bypass channel 49 which by-passes the opening 12 and directly connects the inlet to the outlet. The branch 47 is applicable to the embodiments of FIGS. 1 and 2 and the suction valve 48 can be replaced by a pressure valve.

Figure 6:
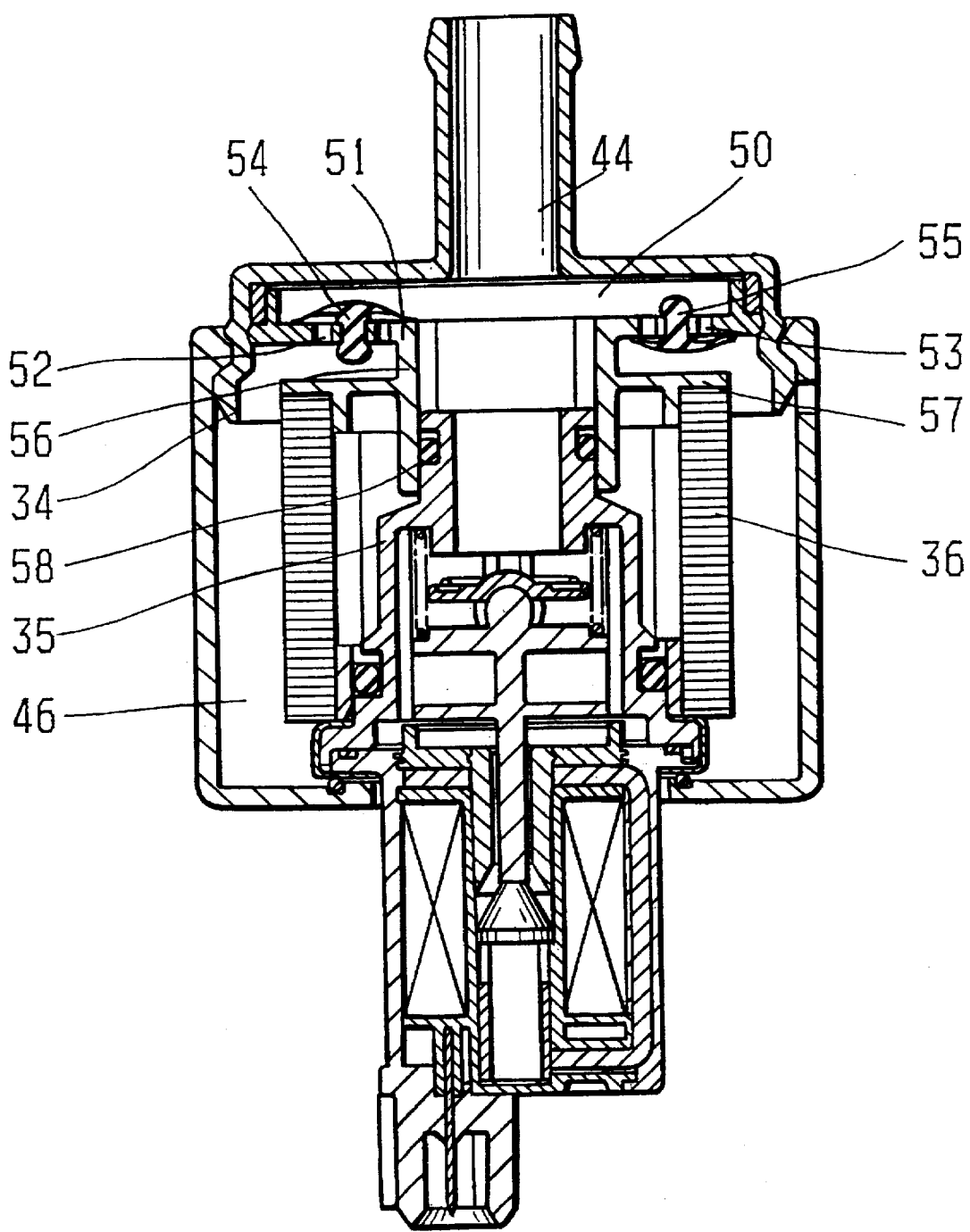
FIG. 6 is a longitudinal sectional view of another embodiment of the electromagnetic valve according to the invention.

FIG. 6 shows another embodiment according to the invention, which, starting from the embodiment according to FIG. 5, has the special feature that connection 44 is opens into an intermediate chamber 50, and two bypass channels 52, 53 are arranged in an axial wall 51 of chamber 50. At its opposite side, wall 51 bounds chamber 46 outside filter 36. The bypass channels 52, 53 are controlled by elastomer closure elements 54,55 which open or close in response to a predetermined pressure difference applied to them. The axial wall 51 is formed on a fitted insert portion 56 inserted tightly into top cup portion 34 in front of connection 44. The filter 36 is supported by a collar 57 on the insert portion 56. The insert portion 56 has a central bore 58 which sealingly receives the smaller diameter portion 35 of the valve housing 11.

Figure 7:
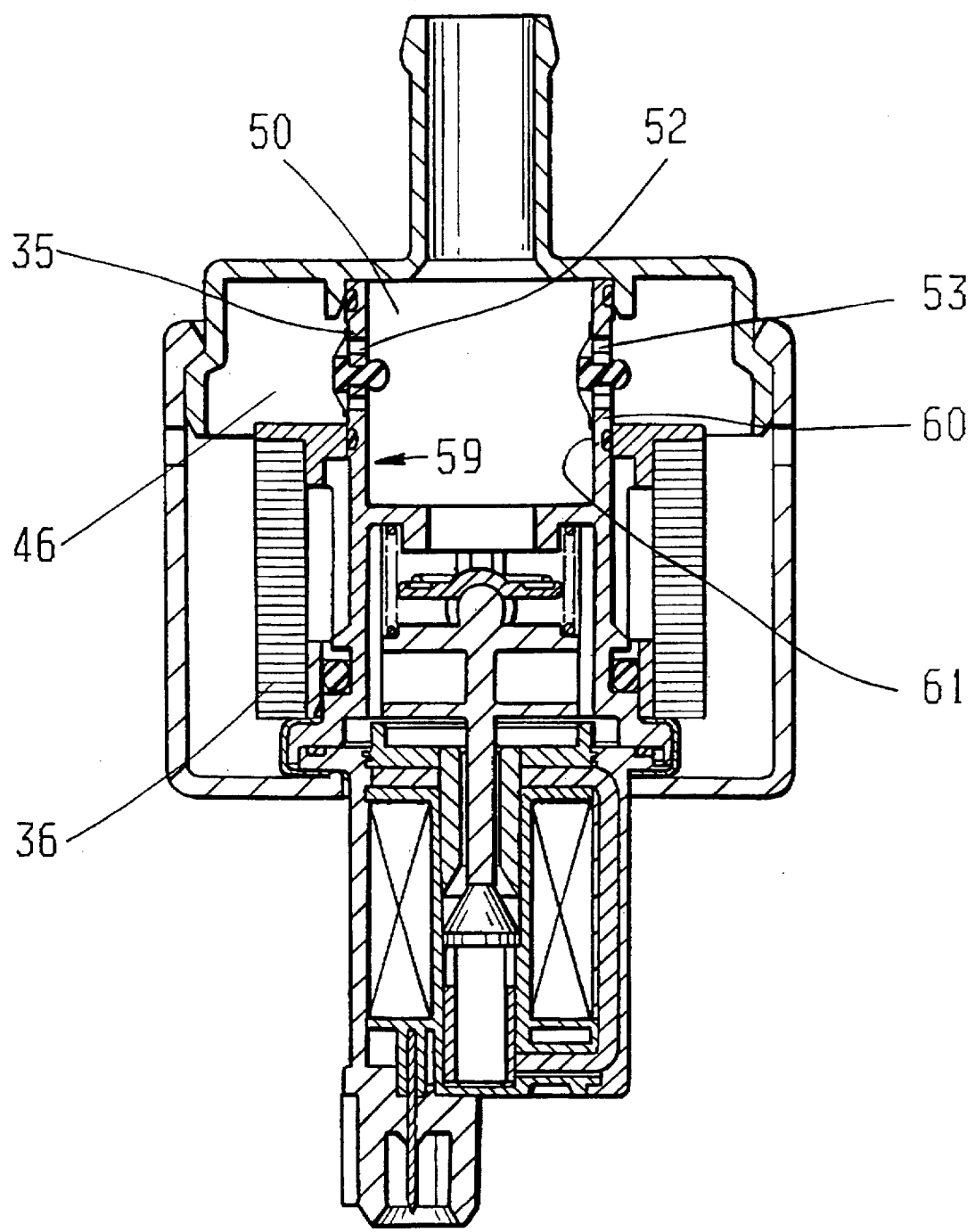
FIG. 7 is a longitudinal section of a further embodiment according to the invention.

FIG. 7 shows another embodiment, in which the two bypass channels 52, 53 are provided in a radial wall 59, arranged between intermediate chamber 50 and chamber 46. The radial wall 59 is formed as a longitudinal extension 60 of portion 56, and extension 60 has a uniform inner diameter 61 which forms intermediate chamber 50, and which sealingly supports filter 36.

The bypass channels 52, 53 could also extend into the interior of filter 36 rather than into chamber 46.

The electromagnetic valve of the invention is suitable for multiple purposes in internal combustion engines, which minimizes the number of parts. In particular, the embodiments of the invention can be rapidly assembled from a minimum number of parts utilizing many common elements. The valve has a great simplicity with a high functional reliability.

The embodiments according to FIGS. 5,6 and 7 permit the valve to be used in units in which a pressure limitation is necessary within the units, for example, a ventilation device for a fuel tank of an internal combustion engine, in order to prevent greater damage upon disruptions in pressure switching, which can occur due to high underpressures or overpressures. In this case, a pressure equilibration is obtained by means of the suction or pressure valves and a predetermined admissible pressure will not be exceeded either above or below the predetermined pressure.

The embodiments of the invention can be realized at relatively low cost due to the simplicity of the parts. The elastomer valve components 54, 55 can be produced as mass-produced articles, at low cost due to the omission of previously employed springs.

Although the invention has being described in connection with specific embodiments thereof it will become apparent to those skilled in the art that numerous modifications and variations can be made within the scope and spirit of the invention as defined in the attached claims.

What is claimed is:

1. An electromagnetic switching valve for use in an internal combustion engine, said switching valve comprising a valve housing having an opening through which a medium can flow from an inlet to an outlet in said valve housing, and a valve plate for selectively opening and closing said opening in said valve housing, a coil housing containing an electrical coil, an armature in said coil housing in operative association with said electrical coil for undergoing longitudinal movement depending upon energization of said coil, a rod movable with said armature, said rod extending into said coil housing into contact with said armature, said rod extending from said coil housing into said valve housing, means in said valve housing for radially guiding said rod during movement thereof, and a ball and socket joint connecting said valve plate and said rod, said rod being engaged with said armature for longitudinal movement therewith without a radial connection therebetween.

2. A switching valve as claimed in claim 1, comprising a biasing spring acting between said valve housing and said rod.

3. A switching valve as claimed in claim 1, comprising two disks integrally formed with said rod, said means in the valve housing for radially guiding the rod comprising longitudinal ribs on said valve housing slidably engaging said disks.

4. A switching valve as claimed in claim 1, wherein said valve housing includes connectors at said inlet and outlet respectively, said connectors being upstream and downstream of said opening for flow of said medium from said inlet to said outlet via said opening, depending on the position of said valve plate.

5. A switching valve as claimed in claim 4, wherein one of said connectors has a valve seat in which said opening is formed.

6. A switching valve as claimed in claim 1, comprising a connection housing having a stepped bore with larger and smaller diameter portions separated by a step, said valve housing being inserted into said stepped bore, O-rings in said larger and smaller diameter portions sealingly engaging said valve housing, said valve housing having perforations between said O-rings which provide communication upstream and downstream of said O-rings, via said opening, depending on the position of said valve plate, said means in said valve housing for radially guiding said rod comprising circumferentially spaced longitudinal ribs on said valve housing, said perforations being disposed between adjacent longitudinal ribs.

7. A switching valve as claimed in claim 6, wherein said perforations open into the larger diameter portion of said stepped bore.

8. A switching valve as claimed in claim 6, wherein said connection housing comprises top and bottom cup portions which are engaged with one another, said top cup portion engaging said O-ring in said small diameter portion of said valve housing, a filter supported by said connection housing in associated with the O-ring in the larger diameter portion of said valve housing such that one side of said filter is exposed to the outlet from said valve housing and the other side of said filter is exposed to a chamber formed in said connection housing, said filter axially bearing against said valve housing, said bottom cup portion including an end wall engaged with said coil housing to axially secure said connection housing on said valve and coil housings.

9. A switching valve as claimed in claim 8, wherein said top and bottom cup portions include overlapping wall elements which are interengaged with one another, one of said wall elements having tongues thereon, the other of said wall elements having apertures into which said tongues are snap-fitted whereby to resiliently secure said top and bottom cup portions together.

10. A switching valve as claimed in claim 9, wherein said end wall has radial slots defining resilient arms therebetween, which resiliently engage said coil housing when said overlapping wall elements of the top and bottom cup portions are interengaged to resiliently secure said valve and coil housings together by said connection housing.

11. A switching valve as claimed in claim 10, wherein said filter has one end supported against said valve housing and an opposite end bearing against said top cup portion.

12. A switching valve as claimed in claim 11, wherein said top cup portion includes an open connector communicating with the inlet of said valve housing at said smaller diameter portion of said stepped bore, said radial slots forming openings which communicate with said chamber in said connection housing.

13. A switching valve as claimed in claim 1, comprising a bypass channel by passing said opening and connecting said inlet to said outlet, and valve means in said bypass channel for opening and closing said bypass channel.

14. A switching valve as claimed in claim 13, comprising an intermediate wall between said inlet and said outlet, said bypass channel comprising two bores in said intermediate wall, said valve means comprising elastomeric closure elements in said bores which open and closed in response to a predetermined pressure difference in said medium at said inlet and outlet.

15. A switching valve as claimed in claim 14, comprising a connection housing into which said valve housing is inserted, said connection housing including top and bottom cup portions which are interengaged with one another, a filter supported by said top cup portion and having one side exposed to said outlet from the valve housing and another side communicating with a chamber formed in said connection housing which opens externally thereof, said top cup portion including a fitted insert portion which includes said intermediate wall and a collar which engages said filter and said valve housing.

16. A switching valve as claimed in claim 14, comprising a connection housing into which said valve housing is inserted, said connection housing including top and bottom cup portions which are interengaged with one another, a filter supported by said top cup portion and having one side exposed to said outlet from the valve housing and another side communicating with a chamber formed in said connection housing which opens externally thereof, said intermediate wall being formed as a longitudinal extension of said valve housing which sealingly engages said top portion of said connection housing.

17. A switching valve as claimed in claim 1, comprising a connection hosing axially connecting said valve housing and said coil housing and a filter in said connection housing for filtering said medium as the medium flows from said inlet to said outlet.

18. A switching valve as claimed in claim 17, wherein said connection housing and filter are constructed to apply axial, resilient force to connect the valve and coil housings together.

19. A switching valve as claimed in claim 1, comprising a connection housing into which said valve housing is inserted, sealing means being provided to seal the valve housing in the connection housing and allow said medium to flow to and from said valve housing via said connection housing.

20. A switching valve as claimed in claim 1, wherein said armature is surrounded by said electrical coil where said armature engages said rod.

* * * * *